June 17, 1930.  H. C. HOLLINGER  1,764,956
WIDE SPREAD
Filed March 7, 1929   2 Sheets-Sheet 1
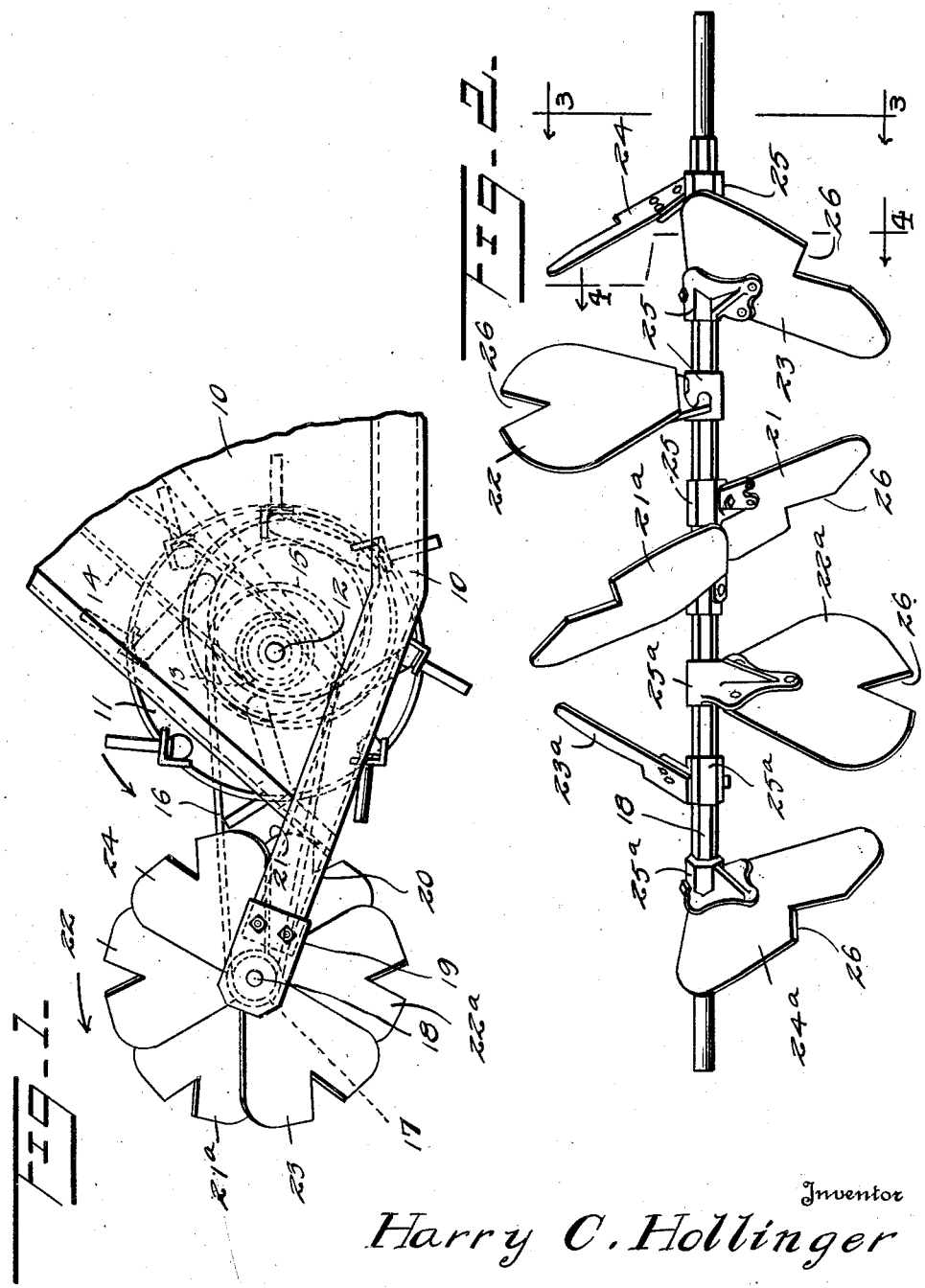
Inventor
Harry C. Hollinger
By Walter W. Burns
Attorney June 17, 1930. H. C. HOLLINGER 1,764,956
WIDE SPREAD
Filed March 7, 1929 2 Sheets-Sheet 2
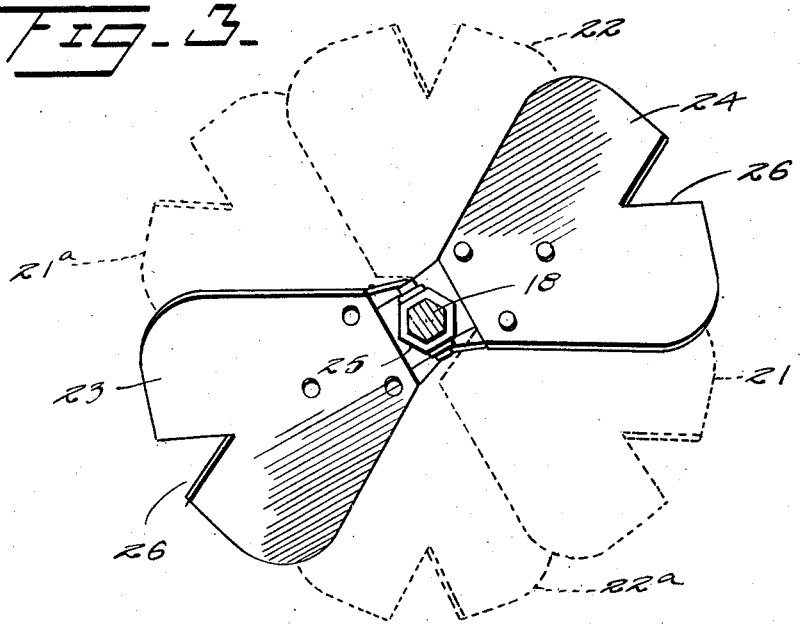
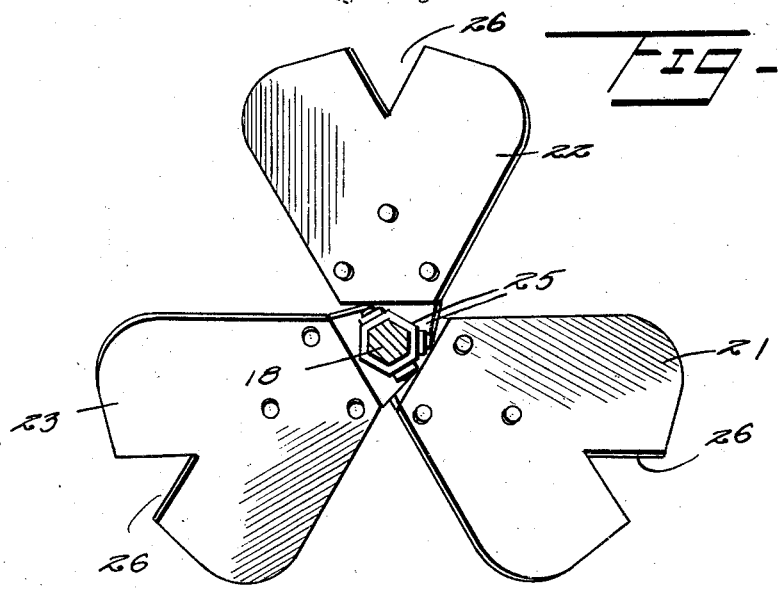
Inventor
Harry C. Hollinger
By Walter W. Burns
Attorney Patented June 17, 1930

1,764,956

UNITED STATES PATENT OFFICE

HARRY C. HOLLINGER, OF YORK, PENNSYLVANIA, ASSIGNOR TO A. B. FARQUHAR CO. LIMITED, OF YORK, PENNSYLVANIA, A LIMITED PARTNERSHIP OF PENNSYLVANIA

WIDE-SPREAD

Application filed March 7, 1929. Serial No. 345,119.

This invention relates to manure spreaders and has particular relation to that part of the spreader which distributes the manure over a path other than the vehicle body and which part is called the "wide-spread".

It has been customary to construct the wide-spread with blades equally spaced along its shaft and equally spaced around its shaft.

In developing this invention it was determined that due to the shape of the load with more manure near the center of the vehicle that as the manure is fed to the rear, an even spread was not exactly obtained with this equal arrangement of the blades.

The primary object of this invention is the provision of an improved manure spreader wide-spread which will distribute the manure evenly over the ground.

Another object of this invention is the provision of a wide-spread which has blades radially unequally spaced about its axis.

Another object of this invention is the provision of a wide-spread having a shaft, the whole being balanced and having blades unequally spaced about the axis with more blades to take care of the load adjacent the center line of its travel.

Another and further object of this invention is the provision of a wide-spread which has a hexagonal shaft with eight blades mounted thereon so that the whole is balanced, yet the blades are unequally spaced about the axis in a manner that more blades are available to spread the load adjacent the center than the ends.

Another and still further object of this invention is the provision of a wide spread blade having an improved disintegrating effect whereby the manure is broken up into fine particles.

Other and further objects of this invention will be apparent from a reading of the complete specification and claims.

In the drawing wherein is illustrated an embodiment of this invention,

Figure 1 is a side elevation of the rear end of a manure spreader.

Figure 2 is a rear elevation of the wide-spread detached, slightly enlarged and showing the relative arrangement of the parts.

Figures 3 and 4 are sectional views on lines 3—3 and 4—4, respectively of Figure 2, but for clearness omitting the showing of some of the blades.

The numeral 10 designates the rear end of the body of the vehicle of the manure spreader, 11 the discharging element which may be of any suitable design to remove the manure from the rear of the load which is slowly moved to the rear by suitable mechanism not shown.

The discharger 11 is mounted on a suitable shaft 12 which carries a suitable sprocket 13 which is driven by a suitable sprocket chain 14.

The shaft 12 also carries a suitable sprocket 15 which drives a chain 16 which in turn drives a smaller sprocket 17 which is mounted on the wide-spread shaft 18 to drive the latter. The wide-spread shaft is mounted in suitable hangers 19 which are supported by the frame members 20.

The wide-spread shaft 18 carries the wide-spread blades which will now be described.

As usually loaded, a manure spreader is loaded more heavily along the center line of the vehicle, it being the natural tendency to load the vehicle with as heavy a load as possible. Since the load moves bodily along the sides and bottom of the vehicle, there is presented at the discharger element, more material adjacent the center. In this invention, provision has been made for taking care of this greater amount of material.

In the embodiment herein described, there are illustrated eight blades. These blades are so arranged that while perfectly balanced there are more blades presented to the load adjacent the middle than adjacent the ends of the wide-spread shaft. This unequal arrangement of the blades permits a greater amount of the manure to be thrown to the sides from adjacent the middle of the shaft and permits a uniform amount to fall to the ground at all parts of the path traversed by the manure spreader.

For the purposes of description, the wide-spread will be divided in two groups—one group on each side of the middle of the shaft. Adjacent the middle of the shaft are arranged two blades, 21 and 21ª. These blades are arranged at 180° from each other and are preferably at such an angle to the plane normal to the axis of the shaft 18 that the manure coming in contact with them will be thrown in opposite directions, each blade throwing toward its own side of the middle of the shaft.

Outward from the blades 21 and 21ª and toward the ends of the shaft 18 are blades 22 and 22ª. These blades are in the embodiment herein shown and described, arranged 120° in advance of the blades 21 and 21ª, respectively, in the direction of rotation.

Outwardly of the blades 22 and 22ª respectively and toward the ends of the shaft 18 are the blades 23 and 23ª. These blades 23 and 23ª are arranged respectively 120° behind the blades 21 and 21ª and 120° in advance of the blades 22 and 22ª, relative to the direction of rotation of the shaft 18.

Outwardly of the blades 23, 23ª are the blades 24, 24ª, respectively. It will be noted that the blade 24 is arranged at 180° from the blade 24ª—on the opposite side of the shaft 18 and that the blade 24ª occupies a similar position relative to the blade 23ª.

The whole unit is balanced both as to the position of the blades, and also as to the reaction to the manure. As already pointed out, the blades 21 and 21ª are arranged at 180° from each other on opposite sides of the shaft. The same relation exists as to position with the pairs of blades 22, 22ª, 23, 23ª and 24, 24ª.

Each blade throws the manure contacting therewith to its own side, thus making four blades throwing manure to one side and four throwing manure to the opposite side. This brings about a balance in thrusts along the axis of the shaft.

The blades 21 and 21ª are, in the illustrated embodiment, slightly closer together than any other two adjacent blades.

It is thus seen that the group of blades 21, 21ª adjacent the middle of the shaft are closer together axially than any other two blades. The groups 21, 22, 23 and 21ª, 22ª, 23ª are arranged at 120° apart about the shaft 18 and the groups 23, 24 and 23ª, 24ª are at 180° apart. As the shaft revolves all of the blades as a unit, it is clear that more material from the discharger 11 will be taken care of at and adjacent the middle of the shaft 18 than adjacent the ends. By this means an equal distribution of the load over the field is effected.

In order to provide a convenient arrangement to hold the blades in proper position, I use a hexagonal stock for the construction of the shaft 18. To secure the body of the blades 21, 21ª, 22, 22ª, 23, 23ª, 24, 24ª to the shaft 18, I provide suitable holders of two types—one for the right side of the shaft and one for the left. Each holder has a hexagonal opening to receive the shaft 18 and a blade attaching arm to which the blade is suitably bolted or riveted. The holders on the right of the machine as shown in Figure 2, I have designated by the numeral 25 and those on the opposite side of the middle, I have illustrated by the character 25ª.

The holders 25 and 25ª are suitably bolted or riveted in place on the shaft.

The holders are so constructed that they will hold the blade bodies at about 45° to the plane normal to the shaft axis.

It has been found that the lumps of manure are broken up not only at the impact with the faces of the blades, but experiments have shown that by increasing the edge length sufficiently, the breaking up of the manure may amount to a pulverization. With the construction as illustrated, the largest particles of manure, as spread, are about half the size as when the edge length is not increased. As a practical solution of the problem, since the greater portion of the particles of manure leave the blade from the outer third of the blade, there is illustrated, an indentation 26, extending from the outer periphery toward the axis for about one third the depth. The exact shape and size of the indentation is relatively unimportant. In the structure shown, with the blade as illustrated, a single indentation is illustrated. The number of indentations per blade may be increased and in case a blade had a greater angular width, the number of indentations might well be multiplied.

It is believed that the above description, taken with the showing on the drawing shows clearly that this invention produces an even distribution of the manure and a great pulverization of the same as it leaves the blades for delivery to the ground.

In some of the claims, I use the word "radially." This refers to the axis of the blade which extends from the shaft axis outwardly.

While there is shown and described in detail an embodiment of this invention, it is desired to have it understood that modifications and changes may be made without departing from the spirit of the invention and within the scope of the appended claims.

Having described my invention what I claim is:—

1. In a manure spreader, a wide-spread having a shaft, radially placed blades mounted thereon, the axes of adjacent blades being angularly spaced about the shaft so that the planes which pass through the shaft axis and the axes of the blades will make unequal angles relative to such planes of other adjacent blades.

2. In a manure spreader, a wide-spread having a shaft, radially placed blades mounted thereon, the axes of adjacent blades being angularly spaced about the shaft so that the planes which pass through the shaft axis and the axes of the blades will make unequal angles relative to such planes of other adjacent blades, each blade having a blade diametrically oppositely placed somewhere on the shaft thereby producing a balanced unit.

3. In a manure spreader, a wide-spread having a shaft, radially placed blades mounted thereon, the blades being angularly spaced about the shaft, those adjacent the middle of the shaft being closer together angularly than those adjacent the ends.

4. In a manure spreader, a wide-spread having a shaft, radially placed blades mounted thereon, the blades being angularly spaced about the shaft, those adjacent the middle of the shaft being closer together angularly than those adjacent the ends, each blade having a blade diametrically oppositely placed somewhere on the shaft, thereby producing a balanced unit.

5. In a manure spreader, a wide-spread having a shaft, radially placed blades angularly spaced about the shaft, those adjacent one side of the middle of the shaft being spaced substantially 120° apart and those adjacent the end of the shaft being spaced substantially 180° apart.

6. In a manure spreader, a wide-spread having a shaft, radially placed blades angularly spaced about the shaft, those adjacent one side of the middle of the shaft being spaced substantially 120° apart and those adjacent the end of the shaft being spaced substantially 180° apart, each blade having a blade diametrically oppositely placed somewhere on the shaft, thereby producing a balanced unit.

7. In a manure spreader, a wide-spread having a shaft, radially placed blades angularly spaced about the shaft, those adjacent each side of the middle of the shaft being spaced more closely together angularly than those adjacent the ends, the corresponding blades measuring both ways from the middle of the shaft being placed on the shaft at substantially 180° apart.

8. In a manure spreader, a wide-spread having a shaft, radially placed blades mounted thereon, adjacent blades being spaced at unequal angles thereabout, the blades being arranged in two groups from the middle of the shaft outwardly, those adjacent the middle of the shaft being spaced angularly closer together, the blades numbering from the middle outwardly coming into operation against the load as the shaft rotates by the consecutive odd numbers followed by the consecutive even numbers.

9. In a manure spreader, a wide-spread having a shaft, radially placed blades mounted thereon, adjacent blades being spaced at unequal angles thereabout, the blades being arranged in two groups from the middle of the shaft outwardly, those adjacent the middle of the shaft being spaced angularly closer together, the blades numbering from the middle outwardly coming into operation against the load as the shaft rotates by the consecutive odd numbers followed by the consecutive even numbers, each blade having a blade diametrically oppositely placed somewhere on the shaft, thereby producing a balanced unit.

10. In a manure spreader, a wide-spread having a shaft, radially placed blades spaced angularly about the shaft, those adjacent one side of the middle of the shaft being spaced at less angles apart than those adjacent the outer ends of the shaft, the two blades on opposite sides of the middle being closest together.

11. In a manure spreader, a wide-spread having a shaft, blades spaced about the shaft and with relation to each other so that planes passing through the axis of the shaft and through corresponding points of adjacent blades will make unequal angles relative to such planes of other adjacent blades.

In testimony whereof I hereunto affix my signature.

HARRY C. HOLLINGER.